(12) United States Patent
Glück

(10) Patent No.: US 8,899,986 B2
(45) Date of Patent: Dec. 2, 2014

(54) AIR RESCUE SIMULATOR

(75) Inventor: Alois Glück, Traunwalchen (DE)

(73) Assignee: Bergwacht Bayern, Bad Tolz (DE)

( * ) Notice: Subject to any disclaimer, the term of this patent is extended or adjusted under 35 U.S.C. 154(b) by 133 days.

(21) Appl. No.: 13/057,485

(22) PCT Filed: Aug. 7, 2009

(86) PCT No.: PCT/EP2009/060303
§ 371 (c)(1),
(2), (4) Date: May 1, 2011

(87) PCT Pub. No.: WO2010/015716
PCT Pub. Date: Feb. 11, 2010

(65) Prior Publication Data
US 2011/0200974 A1 Aug. 18, 2011

(30) Foreign Application Priority Data
Aug. 7, 2008 (DE) .................. 20 2008 010 538 U
Apr. 30, 2009 (DE) .................. 10 2009 019 628

(51) Int. Cl.
G09B 9/08 (2006.01)
G09B 9/46 (2006.01)

(52) U.S. Cl.
CPC ....................................... *G09B 9/46* (2013.01)
USPC ............................................. 434/33; 434/30

(58) Field of Classification Search
USPC .................... 434/11–72; 340/903; 73/147
See application file for complete search history.

(56) References Cited

U.S. PATENT DOCUMENTS

| | | | | |
|---|---|---|---|---|
| 4,601,663 | A | * | 7/1986 | Allison et al. .................. 434/33 |
| 5,316,480 | A | * | 5/1994 | Ellsworth ........................ 434/29 |
| 5,547,382 | A | * | 8/1996 | Yamasaki et al. ............... 434/61 |
| 5,571,038 | A | | 11/1996 | Halling |
| 5,616,031 | A | | 4/1997 | Logg |
| 5,866,813 | A | * | 2/1999 | Nakaya et al. .................. 73/147 |
| 2003/0224333 | A1 | * | 12/2003 | Vastvedt ......................... 434/29 |
| 2004/0029081 | A1 | * | 2/2004 | Jaros et al. ...................... 434/30 |
| 2008/0241801 | A1 | * | 10/2008 | Bocquet et al. ................. 434/55 |

FOREIGN PATENT DOCUMENTS

| | | |
|---|---|---|
| EP | 0872819 A1 | 10/1998 |
| GB | 2281269 A | 3/1995 |
| JP | 2000305446 A | 11/2000 |
| JP | 2001134168 A | 5/2001 |
| KR | 20010090270 A | 10/2001 |
| WO | 8700141 A1 | 1/1987 |
| WO | 0196180 A2 | 12/2001 |

OTHER PUBLICATIONS

Sakamoto A, Teranishi K, Disaster rescue training apparatus for use during e.g. earthquake, has simulation effect installation to change weather condition of base and training deck provided to base selectively based on type of disaster, WPI /Thomson, May 18, 2001, vol:2002,Nr:24, XP 002556221.

(Continued)

*Primary Examiner* — Timothy A Musselman
(74) *Attorney, Agent, or Firm* — Pierce Atwood LLP; Kevin M. Farrell

(57) ABSTRACT

An air rescue simulator, wherein the simulator comprises a helicopter passenger cabin, which is attached to a crane system.

34 Claims, 9 Drawing Sheets

(56) References Cited

OTHER PUBLICATIONS

Kameda T, Moriki M, Hoist training apparatus for training hoist operation of rescue helicopter crew has person simulation goods which undergo relative activity when imitating movement of helicopter, WPI / Thomson, Nov. 2, 2000, vol:2001,Nr:6, XP 002556222.

PCT International Search Report for PCT/EP2009/060303, Mailed Dec. 8, 2009.
Examination Report of the German Patent and Trademark Office, Application No. 10 2009 019 628.5-55 for applicant Bergwacht Bayern, dated Apr. 20, 2010.

* cited by examiner

AIR RESCUE SIMULATOR

RELATED APPLICATIONS

The present application is a national stage entry according to 35 U.S.C. §371 of PCT application No.: PCT/EP2009/060303 filed on Aug. 7, 2009, which claims priority from German application No.: 20 2008 010 538.2, filed on Aug. 7, 2008, and from German application No.: 10 2009 019 628.5, filed on Apr. 30, 2009.

TECHNICAL FIELD

The invention relates to an air rescue simulator which comprises a helicopter passenger cabin, which is attached to a crane system, and allows realistic simulation of air rescue operations for instructional and training purposes.

BACKGROUND

Simulation is a proven means in many fields, allowing instruction on complicated equipment without having to accept the disadvantages which are typically associated with this. For example, aircraft pilots, high-speed train drivers and ship captains use simulator technology for their training. Financial or safety obstacles, which would otherwise prevent reasonable training, can often be overcome only by the use of simulators. Examples of this are space flight or submarines.

In contrast to standard operations such as the rescue and emergency-doctor service, in which the emergency units need only rarely become involved in life-threatening situations, a rescue in alpine terrain and terrain where there is a risk of falling from flooded areas or burning buildings, using a rescue winch or the rescue rope, is often impossible without a certain risk to the rescuers themselves. Even when all feasible safety measures have been implemented, there is a remaining risk. The aim must therefore be to achieve as high a level of safety as possible by optimum training and equipment of the emergency units.

Since the beginnings of air rescue, emergency units have been trained using the actual aircraft in question. This has the disadvantage that, because of the restricted number of available aircraft, these aircraft are repeatedly called on for emergency operations while being used for training and are then no longer available for a period of hours. Further disadvantages which have impeded previous use for training are adverse weather conditions which do not allow flight operation, as well as the need to refuel the aircraft while the training is being carried out. Furthermore, technical defects and the permissible flying times of the pilots and the flight contingents of the aircraft make it harder to carry out regular, controlled use for training purposes. Furthermore, training using the actual aircraft is associated with considerable costs.

There are admittedly many examples of simulations in the field of aviation, extending from radio and navigation training at a desk, via the known flight simulators, to complete cockpits for pilot training. However, all of these systems are restricted to parts and sub-aspects of an operation in actual conditions and do not address all the senses of those involved in the training. They therefore have no far-reaching training value for experienced emergency units, and are not suitable for comprehensive training and training that meets the demands.

The aim of realistic training is not only to prepare for real operations but to allow the subsequently required procedures to be worked through using all the aids and equipment in such a way that not only is knowledge gained but a routine is established. Only such routine generates the desired level of safety and the required performance margins.

SUMMARY

Various embodiments of the invention have an object of providing a capability to simulate air-rescue operations in such a way that the training crews are provided with the impression of a real operation, without having the disadvantages of a training using a real aircraft.

Various embodiments allow the helicopter passenger cabin to be moved freely in a three-dimensional space which is defined by the dimensions of the crane system.

A crane system such as this can also allow a plurality of helicopter passenger cabins to be operated at the same time.

The helicopter passenger cabin which is used in the air rescue simulator according to the invention may, for example, be an original helicopter which can no longer fly and has been gutted, or an original helicopter passenger cabin, or else a mock-up or a model of a helicopter passenger cabin.

According to one embodiment of the invention, the helicopter passenger cabin can be suspended on the crane system by means of one or more cables.

By way of example, the crane system that is used according to the invention can be located in a hall, as a result of which the simulator is independent of external weather conditions.

In one embodiment of the invention, the crane system that is used is a gantry crane, semi-gantry crane or bridge crane.

If the crane system, for example a bridge crane, is accommodated in a hall, the crane track supports, which preferably extend over the entire length of the hall, may be a component of the hall structure and, for example, may be fitted to the walls of the hall, or integrated therein. The crane bridge can then be moved through the hall on these crane track supports.

If a plurality of helicopter passenger cabins are intended to be used, for example in a training hall, the crane system may also have a plurality of crane bridges, which can be moved independently of one another on common crane track supports.

The supports when using a gantry crane, or the crane bridge when using a bridge crane, may be moved, for example, using frequency-controlled drives, and their speed can therefore be controlled infinitely variably.

The crane trolley, which can be equipped with a lifting and rotating mechanism, runs in the lateral direction on the crane bridge.

In one embodiment of the invention, the helicopter passenger cabin is suspended on the crane trolley. By way of example, cables may be used for suspension.

In one embodiment of the invention, the helicopter passenger cabin is attached to the crane system via a frame structure. This frame structure, which may be fitted externally on the helicopter passenger cabin as well as in the interior of the helicopter passenger cabin, may be a frame structure which supports the static load of the passenger cabin.

The connection between the frame structure and the crane system may, according to one embodiment of the invention, be provided by means of a cross-member, to which the frame structure is connected. By way of example, this cross-member comprises an upper part which is used for suspension on the crane system and is therefore also designated as the crane cross-member, and a lower part, which is used for suspension of the frame structure. In one embodiment, the frame structures may be suspended on the cross-member, in particular the lower part of the cross-member, by means of a tilting joint, for example a gimbal joint. This tilting joint allows the frame structure and the cross-member to be moved relative to one another, thus allowing the passenger cabin to be tilted sideways, for example.

According to one embodiment of the simulator according to the invention, the frame structure may comprise a gimbal frame for suspension on the lower part of the cross-member by means of a gimbal joint, a roof frame which is firmly connected to the roof of the helicopter passenger cabin and the gimbal frame, and a cabin frame which is firmly connected to the roof frame and surrounds the helicopter passenger cabin or is likewise firmly connected to it. The cabin frame is fitted in the interior of the helicopter passenger cabin, or may be integrated in a side wall part, roof part or bottom part of the helicopter passenger cabin, or may be fitted externally on the helicopter passenger cabin, or may surround the outside of the cabin. The gimbal frame and lower part of the cross-member, which are connected via a gimbal joint, may, according to one embodiment, be moved relative to one another by means of one or more adjustment elements, such as pneumatic springs.

In one embodiment of the invention, the simulator has helicopter skids which are attached to the helicopter passenger cabin or to the frame structure, for example the cabin frame. The skids may be composed of plastic, aluminum or steel. A hard material such as steel has the advantage that the skids themselves contribute to the stabilization of the frame structure. It is therefore possible to design the frame structure to be more filigree, and thus to integrate it in a space-saving manner in the helicopter passenger cabin wall. This means that there is no need for any space-consuming frame structure outside the helicopter passenger cabin.

According to one embodiment of the invention, the helicopter passenger cabin of the simulator has a helicopter tail. In one particular embodiment, this tail is shortened by means of a telescopic mechanism. This has the advantage that the usable area in the air and the freedom of mobility of the cabin in a hall can be increased by a shortened tail. The normal tail length, which is achieved by extension of the tail using the telescopic mechanism, is in contrast required only in order to realistically represent the dimensions of the helicopter on the ground, and therefore to ensure the training effect. This is particularly important because the actual helicopter has a tail rotor which is a particular source of danger during operations.

In one particular embodiment of the invention, the helicopter tail therefore has a tail rotor or a tail rotor mock-up. This is provided with a drive, for example an electric motor, and may be produced from a plastic, such as hard foam with GFC stabilization, in order not to cause serious injuries on collision with a person.

In a further embodiment of the invention, the simulator additionally has a (main) rotor mock-up. By way of example, this may be composed of a space frame structure. This can optionally be covered at the top and/or bottom by a metal grating, for example an aluminum grating. The rotor mock-up is fitted above the helicopter passenger cabin and, for example, may be firmly connected to the cross-member.

The dimensions of the rotor mock-up preferably correspond to the actual original, that is to say to the rotor of a helicopter which can fly, and therefore has a diameter of 5 to 9 m, preferably 6 to 8 m.

In order to simulate winch operation during an air rescue operation, the air rescue simulator is, in one embodiment of the invention, equipped with a winch, optionally with a pivotable cantilever arm. The operating capability and speeds of this winch correspond to those of an original winch. The winch can be attached directly to the helicopter passenger cabin or to the frame structure, for example to the roof frame.

One major stress factor when using helicopters is the downwash which is produced by the rotating rotor blades. One requirement for a realistic training situation is therefore to produce wind speeds that are as high as possible and high flow volumes in those areas in which the emergency units will be located during the training, in order to simulate the downwash of the rotor blades. For this reason, in one embodiment, one or more wind generator(s) are fitted to the air rescue simulator according to the invention. These are preferably positioned above the entrance and/or above the cockpit.

Exemplary wind generators with a power consumption of 7.5 kW produce a flow volume of 72000 m$^3$/h at a flow speed of about 60 km/h during continuous operation. By way of example, they are operated using frequency converters and can emit considerably greater power levels for short periods.

Particularly when the sun is shining, the rotating rotor blades cause a flickering light situation which causes stress to many people and, in individual cases, can trigger an epileptic attack. This effect can be simulated by the use of stroboscopic flashlights. The intensity and frequency of these stroboscopic flashlights can preferably be controlled, thus making it possible to control the intensity of the effect.

The air rescue simulator according to the invention may therefore additionally have one or more stroboscopic flashlights which simulate light effects caused by rotating rotor blades.

Both the wind generators and the stroboscopic flashlights can be arranged in or on the rotor mock-up.

In one embodiment of the air rescue simulator according to the invention, control elements for controlling the simulator are available in the helicopter passenger cabin. These comprise a plurality of control elements which can simulate original instruments. By way of example, these elements can be used to control the height above ground, the direction of travel and the speed of travel, the inclination attitude and/or the rotation of the cabin.

This is done by coupling the control elements to the drive for the crane bridge and the crane trolley as well as the lifting mechanism and the rotating apparatus of the crane trolley, and the adjustment elements between the frame structure and the cross-member. Furthermore, control elements can be integrated which control the wind generators and the stroboscopic flashlights.

By way of example, realistic control elements comprise a collective for controlling the height of the cabin above ground, a stick for controlling the direction of travel and the speed of travel, pedals for controlling the rotation of the cabin, and an extra element for changing the inclination of the fuselage.

The above-mentioned control elements produce inputs for movement of the helicopter passenger cabin. These control signals can be processed by a freely programmable computer unit. Force measurement sensors on the cabin suspension and a rotation-angle transmitter on the crane bridge can produce additional signals which, in conjunction with a digital data model of the area surrounding the simulator, are intended to allow realistic flight operation. In this case, the programming can be carried out such that movement requirements are implemented by the control unit only when the required movement does not cause a collision in the data model. In this case, the data model may comprise a 3-D data area in which the geometric structure of the area surrounding the crane system is mapped, such that parameters are associated with each three-dimensional point. These parameters may be, for example, the parameters "obstacle" or "no obstacle". In such an embodiment of the invention, the control signals from the control elements would be implemented only when the control signals result in a movement of the helicopter passenger cabin within the "no obstacle" data subarea.

In a further embodiment, the simulator may have displays in the cockpit of the helicopter passenger cabin which allow the crew to monitor the current status of the cabin. By way of example, both the values from the force measurement sensors and the center of gravity of the cabin, calculated from this, can be displayed. Trimming can therefore be carried out at any time. The instantaneous height above ground, the speed, the deployed cable length from any winch that is fitted, images from additionally fitted safety cameras and, when a plurality of helicopter passenger cabins are being used on one crane system, the positions of the other helicopter passenger cabins, can likewise be displayed.

Cameras may be located directly at the front in the cockpit in the helicopter cabins, above the winch, below the machine and on the tail rotor, whose images can be displayed on a monitor system in the cockpit in real time, and/or can be transmitted via a radio system to a control center where, for example, they can be recorded.

One embodiment of the simulator furthermore has a radio system which may be coupled to the radio helmets of the training crew and/or may be technically and/or functionally identical to the equipment used in rescue helicopters.

Furthermore, the radio system may also be coupled to a stage radio system via which background noise such as wind noise, rotor noise or turbine noise can be played into the headsets of the users. Alternatively, a loudspeaker system which, for example, is integrated in the rotor mock-up, can also be used for this purpose.

Like the image data, the radio traffic can be recorded in a control center.

In one embodiment, radio helmets in which a headset for radio reception is incorporated in the closed shell of the helmet can be used together with the air rescue simulator. These radio helmets can be coupled via radio signals to the simulator radio system.

The invention therefore also relates to radio helmets in which a headset for radio reception is incorporated in the closed shell of the helmet. These helmets have the advantage that the robustness of the helmet shell is not endangered or restricted by subsequent modifications to the helmet shell in order to allow a radio headset to be worn at the same time.

Further embodiments and aspects of the invention will be explained in the following description.

The simulation system according to the invention makes it possible not only to prepare for real operations but to work through the subsequently required procedures using all the aids and equipment such that not only is knowledge gained but a routine can also be established. Only this routine achieves the desired improvement in safety and the necessary performance margins. The novel and unique combination of transparent hall architecture, crane and control technology and originally equipped helicopters makes it possible to comprehensively provide the crews with the sensation of a real operation. An authentic sense of free space and free mobility of the cabins make it possible to blur the bounds of reality and to resolve them. The simulation system according to the invention adopts this approach. In this case, simulation is not: "to do so as if", but: "virtually as if". Real helicopters, real movement, real wind, noise and real height with real landscape scenarios for the first time produce real risk awareness, and therefore satisfy the required purpose.

According to one embodiment of the invention, the degrees of freedom of a helicopter cabin during real flying operation are approached as closely as possible by means of a powerful crane installation for the helicopter cabins suspended on it.

The crane installation is located, for example, in a hall with a length of 60 meters, a height of 20 meters and a width of 25 meters. This large hall may, for example, be subdivided into three zones:

1. The Combined Area

By way of example, a pool may be provided here with a length of 15 meters, a width of 10 meters and a depth of three meters with a wave and flow system, an alpine rock and hill landscape with crevices as well as springs and water holes for training the canyoning rescue groups. Short caves and a small but for sheltering people with a roof, balcony and window can be integrated in the rocky landscape.

2. The Technical Area

For example, a lift installation with chair lifts and small cabins, an electricity pylon, a building crane and two material test installations may be located here. A helicopter training tower for basic training on the cabin can also be located in this zone.

3. The Alpine Area

By way of example, a climbing wall with a height of 18 meters, with a ledge and a rocking ridge at the peak may be provided here.

A range of training advantages can be achieved by the simulation of the helicopter movements in the large hall and the crane technology used for this purpose, without any speed or acceleration values, as are known from real flight situations, being required in this case. The important factor is in fact the capability to carry out repetition as frequently as required, which is made possible by recording the flight movement. Without any risk, it is possible to move the cabin into and to hold it in inclined positions which would otherwise be critical. According to one embodiment of the invention, all the components of the crane bridges and the suspensions have the necessary performance margins, load-bearing parts have at least twice the strength values, safety-relevant mechanical components such as the braking system are duplicated, and the control technology is considered to be fail-safe. According to one embodiment of the invention, the lifting mechanisms and the drive units for movement of the helicopter cabin can be driven directly from the cockpit and from the control room via a standardized system. The chosen concept is therefore highly flexible and can be upgraded as required. The link to the crane bridge may be provided both visually, electrically or else by radio, and the system is designed such that it can be scaled as required, in terms of control technology.

According to one embodiment of the invention, the installation is designed such that, in the first months of the operating phase, it can be operated at reduced speeds and with restricted motion capabilities, for safety reasons. The degrees of freedom can be increased step-by-step over time. For example, these adaptations can be achieved by means of the software, with the hardware of the crane installation being designed such that it is already suitable for the desired upgrades. The flexible design furthermore makes it possible to upgrade the control electronics with additional modules. One item that may be mentioned here, for example, is electronic oscillation damping in order to eliminate the oscillations of the helicopter cabin.

If further crane bridges are used later, then these can be equipped with distance measurement devices thus making it possible to prevent a collision between the bridges. Ultrasound sensors can subsequently be fitted to the cabin, such as those known as a parking aid from passenger car technology. In addition, pressure sensors can be mounted on the skids, such as those normally used for garage doors, in order to prevent people or vehicles from being trapped.

Crane bridges are the backbone of the installation. According to one embodiment of the invention, they each have a span of, for example, 25 meters and are moved in the longitudinal direction through the large hall. By way of example, they are moved by means of frequency-controlled drives, and their speed can therefore be controlled infinitely variably. The crane trolley with the lifting mechanism and rotating apparatus runs in the lateral direction on the bridges. All of the components can be provided with generous performance margins, and may be designed to be suitable for continuous operation. The crane track supports may be a component of the hall structure and may run through the entire hall length. In order to minimize the noise that is produced by the movements of the crane bridges on the crane track supports, and in order to make it possible to provide a capability for fine adjustment of the crane track rails, these rails may be mounted screwed on elastomers, that is to say clamped. The configuration of the crane track supports may be designed such that, during the subsequent upgrade stage, all three crane bridges on one common length measurement rail can read the required information for position determination, and the electrical power supply is ensured. Various control elements for control purposes are available in the cabin, and can simulate the original instruments. For example, the height of the cabin above ground can in principle be controlled via the collective, and the stick governs the direction of travel and the speed of travel. The inclination attitude of the cabin can be varied via an extra element. Two pedals in the floor area can control the rotation of the cabin. These all produce the inputs for the cabin movement. These control signals can be processed by a freely programmable computer unit. Force measurement sensors on the cabin suspension and a rotation-angle transmitter on the crane bridge can produce additional signals which, in conjunction with a digital data model of the installation, allow realistic flying operation. According to one embodiment of the invention, movement demands from the control unit are implemented only when the required movement will not initiate any collision in the data model. This installation concept therefore allows even untrained people to control the helicopter cabins, while allowing them to experience a rescue operation from the pilot's perspective, in a form of role reversal. This change in perspective will contribute to gaining an understanding of the difficulties from the view of the pilot, and can therefore assist in avoiding critical situations during an actual operation.

According to one embodiment of the invention, the displays in the cockpit allow the crew to monitor the current status of the helicopter cabin. Both the values from the force measurement sensors and the center of gravity of the cabin calculated from them can be displayed. Trimming is possible at all times. The instantaneous height above ground, the speed, the deployed cable length of the winch, the images from the safety cameras and, later, the positions of the other cabins in the hall can likewise be displayed. The cameras may be located in the helicopter cabins directly at the front of the cockpit, above the winch, below the machine and on the tail rotor. The images from the cameras can be displayed on a monitor system in the cockpit in real time, and can be transmitted via a radio system to the control center where they can be recorded in digitized form. The radio system may be technically and functionally identical to the equipment used in rescue helicopters. Both the coupling of the radio helmets of the emergency units and radio operation with other units outside the cabin are ensured. Further options can be achieved by additional combination with a stage radio system. For example, additional background noise such as wind noise and rotor noise or turbine noise can be played into the headsets of the training crew. In addition to this functional scope, all of the radio traffic can be digitally recorded, with the audio tracks therefore being stored with time information such that they can subsequently be synchronized with the camera recordings.

Winch operation on the helicopter cabin is a central element of training. Although it is technically possible to use original winches, these can be dispensed with for various reasons: there is no need in the simulation to save every possible gram of weight in the structure, and the price is also a critical factor. A replacement winch is heavier, but can be used continuously for this purpose. The critical factor for the use of non-original winches is the capability to drive them by means of a frequency converter, in such a way that the winch processes can be controlled by realistic control actions at realistic speeds. The shape and handling of the winch hook, as well as the pivoting movements, may correspond to the original.

The tail rotor of the fuselage is a particular hazard source during operation. Because of the high rotation speed and the optical transparency of the tail rotor associated with this, it is often overlooked in the general noise background. However, even the slightest contact with this component of the helicopter has fatal consequences for man and machine. For this reason, it is essential for the training installation to have a driven tail rotor, but this component must not present any actual danger. The tail rotor blades may therefore be manufactured from hard foam with GFC reinforcement, and may be driven via an electric motor. The complete tail of the helicopter is only required when the helicopter is on the ground or the crews are working on the cabin. When the helicopter is in the air, then the tail can be greatly shortened by means of a telescopic mechanism, thus increasing the usable area and the freedom of mobility of the cabin in the hall. The extension and retraction of the tail can be controlled from the cabin, as can the drive for the tail rotor.

One major stress factor when using helicopters is the downwash which is produced by the rotor blades. One requirement for a realistic training situation is to have wind speeds that are as high as possible and a high flow volume in those areas in which the emergency units are located during the training. Powerful wind generators can therefore be fitted to the cabins, both above the winch and entrance area and, directed slightly forward, above the cockpit. According to one embodiment of the invention, each of these generators with a power consumption of 7.5 kW produces a flow volume of $72000 \, m^3/h$ at a flow speed of about 60 km/h, during continuous operation. According to one embodiment of the invention, these can also be operated via a frequency converter and can briefly emit considerably higher power levels. They can be integrated in a disc-like superstructure on the cabins and are therefore protected. Thus, the suction of lightweight objects is prevented.

According to one embodiment of the invention, a powerful loudspeaker system is provided, which can be driven with any desired noise, whose level is variable over a wide range. It is thus possible to play back rotor and turbine noise, as required by the respective training task and situation. The loudspeakers can be integrated in the superstructure of the helicopter cabin.

According to one embodiment of the invention, not the entire hall is heated, but heating is provided only in the helicopter cabins, in the control room and in the base camps. The concept of the training installation aims for the training situation to be as realistic as possible. According to one embodiment of the invention, the walls of the installation are transparent, allowing sunlight to enter without any impediment, and making it possible to see outside, which means that a dazzling effect may occur. In the winter months, the fact that the installation has no heating means that heavy and warm clothing as well as gloves are required. These difficulties are desirable. Particularly when the sun is shining, a flickering light situation can occur because of the rotating rotor blades. This phenomenon causes stress in many people and, in individual cases, can trigger epilepsy. This effect can be simulated by the use of stroboscopic flashlights. These may be controllable with respect to intensity and frequency. The intensity of the effect that is caused and the influence resulting from it on the training crew can be therefore be adjusted within wide ranges as a function of the background lighting.

A control station can be integrated in the climbing wall. This is a room with a clear view of the entire installation. Because of the good view, it is possible to follow and to monitor the flight movements of the helicopter cabins from this room. This task can be assisted by a camera system which is installed in the hall; its images and the images from the cameras in the cabins are transmitted to and recorded in the control room. There may be a voice link to the helicopters and to the crews from the control room. The voice link can also be digitally recorded and can be synchronized with the helicopter positions and the camera recordings. When the software is in the recording mode, then the movements of the cabin are automatically also recorded by the control computer. This makes it possible to store and to subsequently repeat individual movement processes.

In order to simplify the first contact with the installation, a so-called familiarization mode is available. A simple flight routine is then stored in the system, which means that the crew can first of all become familiar with the processes without having to accept any risk of control errors. This demonstration mode can then be extended to form a safe step sequence. Individual flight sections are stored here and are carried out in sequence by the crane installation. The pilot simply gives the instruction to carry out the next step, without being able to influence the route.

The large hall concept for simulation of air rescue situations has a range of completely distinct advantages:

The Gain in Safety

Compared with fixed-wing aircraft, helicopters are considerably more susceptible to accidents: between 1980 and 1998, the German Federal Bureau of Aircraft Accidents Investigation (BFU) statistically recorded 54 accidents with six deaths for every million helicopter take-offs, with only ten accidents, with 1.6 deaths, in the case of fixed-wing aircraft. Proportionately, a greater proportion of the causes of the accidents was human failure (more than 80%). From the engineering point of view, helicopters are no less safe than fixed-wing aircraft and are designed and licensed in accordance with the same reliability requirements. The higher risk of accidents can rather be explained by the operating conditions: rescue services and the military cannot determine a point of operation in advance, obstacles such as antennas or electricity lines are then not known by the pilot.

The situation in the simulation installation is different: here, the cabin is suspended on a robust crane installation with a high supporting force and generous safety margins, a crash is not to be expected. It is also possible to provide winching experience on the helicopter, particularly for candidates and untrained personnel. The planning safety and the cost-effective technology allow any training exercise to be repeated indefinitely without the costs escalating, simply because the helicopter is suspended on the cables of the crane installation during the winching processes. In contrast to this, the phase of stable hovering in actual flight is actually associated with high stress levels for man and machine, the fuel consumption while hovering rises to about twice the average consumption, and in general this state is associated with the greatest risks in helicopter flight.

The Ecological Advantage

Reduced $CO_2$ Emission

Helicopters, with a specific energy consumption of about 160 grams per passenger kilometer, are at the peak of all forms of transport, similar to commercial jet aircraft. For comparison: on average, a passenger car consumes on average g, while long-distance bus traffic results in 15 g of primary energy per passenger kilometer—by far the lowest consumption. It can be assumed that at least 80 PS of engine power will be required per passenger seat or 100 kg of payload in order to allow a helicopter to be reasonably used even in unfavorable atmospheric conditions. If the aim is to allow the machines to be used for rescue services, the required power converted to a per seat basis rises steeply, and in some models reaches 160 PS/seat. The main reason for this is the greater empty weight, the more extensive avionic equipment and redundancy of a number of systems, such as those required for blind flying. Conventional helicopters use kerosene as fuel in order to produce this power. Kerosene, a light-fraction petroleum, is a jet-A1 fuel for turbojet engines. Kerosene differs from petroleum essentially by the addition of additives which make it easier to use it as an aircraft fuel. When kerosene is burned, it produces 2760 grams of carbon dioxide per liter of fuel that is burned. Carbon dioxide has a density of about 2 kilograms per $m^3$, thus meaning that one liter of kerosene results in about 2500 liters of gaseous carbon dioxide. Furthermore, kerosene is among the substances that are hazardous to waters.

Consumption values for helicopters which are used for air rescue:

| Type | Fuel consumption: |
|---|---|
| BO 105 | 210 l/h |
| EC 135 T2i | 225 l/h |
| Bell 212 | 330 l/h |
| EC 155 | 375 l/h |
| SA 330 Puma | 660 l/h |
| AS 332 L1 Super Puma | 500 l/h |

If one assumes an average kerosene consumption of 350 liters per training flying hour, with an assumed basic training amount of 3300 flying hours per year for calculation of the $CO_2$ saving by simulation of helicopter flights, then this, highly conservative, calculation itself means a $CO_2$ saving of approximately 3000 tonnes of $CO_2$.

The Reduced Noise Development

The characteristic chattering which has also earned helicopters the nickname "choppers" is produced by the rotor blades. The aerodynamic development of rotor blades has led to a drastic reduction of this noise in cruise flight since the time of the Vietnam War. This has been ensured alone by the limits imposed by the International Civil Aviation Organization (ICAO), who defined the first noise limits for helicopters as early as the beginning of the 1980s. Air vortices are created at the blade tips particularly during descending and hovering flight, and the next rotor blade passes through these vortices during descending flight. This sudden pressure change can be heard on the ground in the form of the characteristic chopping noise. By way of example, at a distance of 30 meters from a helicopter that is taking off or landing, a sound level of 87 dB(A) has been measured during trials. A maximum of 67 dB(A) has also been measured on the ground when a helicopter flies over at cruise speed at an altitude of 150 m—which is generally the applicable minimum altitude outside towns with dense populations. However, it should also be stated that the noise level from non-optimized and in particular old equipment can, during take-off, landing and in hovering flight, reach the range from 90 to 110 dB(A) which damages the human hearing. Even on the basis of basic utilization, the operation of the simulation installation moves 3300 flying hours from the open air into the hall. The flight noise level can be matched to the requirements in the hall. Technically, it is possible to use the loudspeaker system to achieve a similar noise level in the area directly surrounding the helicopter cabins as during actual flight operation. This will undoubtedly be required and desirable only rarely, not least because the flight noise can also be played back as background noise into the headsets of the emergency units. The noise level can be increased infinitely variably for a familiarization programme, for example for the training of avalanche dogs. The relocation of the flying hours into the hall avoids about ten hours of helicopter flight noise every day, resulting from training operation.

The Financial Advantage

Because of the demanding technology, helicopters in principle involve a large amount of operational effort, which is evident in the costs. It can be assumed that operation of an average helicopter for rescue purposes costs around 45 euros per minute, which corresponds to 2700 euros per operating hour. Assuming basic utilization of 3300 flying hours, this therefore results in a calculated cost of virtually 9 million euros per annum. The operating costs for the hall and the crane installation with simulation are about 400000 euros per annum. This therefore results in a calculated amount of 2.00 euros per flying minute.

A range of training upgrades are possible in the installation. Particularly in the field of environmental protection and catastrophe operations the requirements will increase in the coming years. In fields such as construction of avalanche protection, the feeding of wild animals or the recovery of animals, after mud slides or in the case of forest fires, rescue forces will generally have airborne assistance, or the entire rescue may even be carried out from the air. Helicopters are often used in order to recover and evacuate people in an acute emergency situation following accidents, acute illness or in environmental catastrophes such as flooding or fire. The subject areas of cable-car rescue, rescue from high levels from construction cranes, wind rotors, building roofs and much more can be covered by simple construction measures in the installation. Little technical effort is involved in equipping the helicopter cabin with specific reception installations and for simulating searches for those buried in an electronically simulated avalanche area.

Such training areas are already available and in use for ground crews. However, at the moment, training for airborne searches is possible only by using flying helicopters. The use of mobile thermal imaging from a flying helicopter by the Bavarian Mountain Rescue could also be considered for training purposes in the future. Technical systems such as these can easily and cost-effectively be tested in the hall, and training can be provided for their handling. Thermal imaging can be used in mountain rescue both for searching for people and for searching for remaining fire sources after a mountain forest fire. The Bavarian Mountain Rescue is involved in about 100 searches for people every year, and they are involved in virtually every operation for fighting mountain forest fires. A training unit for handling the extinguishing water containers can be set up for this purpose in the hall, without major additional effort.

According to one embodiment of the invention, the installation covers a ground area of about 60 by 25 meters, on which various three-dimensional objects such as a climbing wall or a training building are arranged. A helicopter cabin moves in a hovering manner within the large hall. None of the movements of the helicopter cabin should lead to a collision with the structures located in the room. A control system must therefore be provided which on the one hand receives the inputs of control commands from the control elements in the cockpit, but carries these out only when the desired movements cannot result in a collision. All training is furthermore accompanied by a controller who is located on the ground outside the helicopter and is in visual contact with the group being trained and the fuselage. This person has an emergency-radio-off capability to stop the crane movement and to take over the control of the cabin in creep speed.

A number of approaches may be considered in order to achieve the required protection for the helicopter movement: for example, the cabin can be protected by means of sensors based on laser, ultrasound or camera technology, which is complex. This is because the cabin can move freely in the three-dimensional area, and because of the fact that in training situations mountain rescue personnel and persons are located in direct proximity to the helicopter (winching, familiarization), and would trigger the sensors without this being desired.

According to one embodiment of the invention, the helicopter is seen as a structure which cannot approach within a specific distance of the closest surface of a three-dimensional object. If the helicopter is approaching an object, then the helicopter is automatically decelerated the closer it comes until, finally, it is completely stopped on the boundary surface. By way of example, all obstacles may be surrounded by cuboid protection areas in the control unit, overhangs of the real obstacles can in the data model be filled to the floor, as a result of which there are no undercuts in the data model. This achieves that the cabin cannot swing into the obstacles even in the event of an emergency stop as a result of appropriate relationships between the safety clearance and the permissible speed. If this relationship is stored in a multi-dimensional list, then the speed can furthermore also be made dependent on the height of the cabin in space. This is achieved by varying Vmax as a function of the oscillation length. Overall, this means that the cabin is moved without being decelerated only when it is sufficiently far away from any obstacles. If it approaches within X meters of an obstacle, the decelerating process to safe speed levels starts at this stage. The final part of the distance is traveled at creep speed, until the cabin comes into contact with the object itself. This highly limiting technology represents an adequate possibility to simulate completely free mobility of an operational helicopter in the hall.

According to one embodiment of the invention, the control system can theoretically be split into a safe part and an unsafe part. The unsafe part comprises the pilot and his input capabilities, such as pedals, stick, collective, angle measurement means and the thus generated control signals. The inclination angle sensors in the cross-joint cross-member indicate the inclination angle state of the cabin. If this exceeds a certain level, then the crane installation drives in the horizontal direction of the inclination, and the cabin drifts away at a creep speed. This creep speed can be overwritten via the control input, and can thus be compensated for. By means of compensation control in the cabin, the pilot can compensate for the inclined position of the cabin by pneumatics, and can recreate the horizontal position. All these control signals are regarded only as a non-binding movement wish. The signals from these components are supplied to the safe part of the control system. This part may comprise Category 3 components (fail-safe). This is where the test for permissibility is carried out. The movement desired by the pilot will be carried out only when the desired movement will not cause any problems in the next time period X.

According to one embodiment of the invention, this control system is complemented by a series of additional restrictions and emergency-off functions. For example, the cabin will be raised only when the tail rotor is retracted, and when the external safety observer has confirmed his agreement by pushing a button. The helicopter will therefore move only in the Z direction until the load on the cabin is recorded on the force measurement bolts. Only then may the fuselage move in the X and Y directions, or turn. If the winch arm has been pivoted out and/or cable has been deployed, then the speed of the cabin is restricted to a safe value. A cable load sensor provides information about the load on the winch cable. The crane is stopped immediately at a defined load F_winch.

According to one embodiment of the invention, a collection point for the data from the unsafe sensors is located in the helicopter cabin. This also receives values from the absolute transmitters from the stick, collective, pedals, rotation-angle transmitters and inclination-angle transmitters. An angle correction can be carried out mechanically in the cabin itself.

By way of example, the unsafe sensors may include:
Winch pivoting sensor (ultrasound or laser)
Tail extension sensor (ultrasound or laser)
Rotation speed measurement means for the wind machines and on/off This collection point, for example a SIMATIC S7, can control: the wind generators, the extension of the helicopter tail, the pivoting of the winch arm and the deployment of the winch cable. A display panel for visualization of the following data, for example, can likewise be located in the cabin:
System clear
Control dominance in the cabin (this may also be included in the radio control)
Rotation speed of the wind machines
Tail retracted
Compressor on/off
Pressure in the pneumatic system
Weight of the cabin and the force on the measurement bolts
Switching states of the inclination detection means
Winch arm retracted or extended
Winch cable retracted or extended
Force on the winch cable
Co-ordinates of the cabin in space (height measurement)
Rotation angle of the cabin axis
Distance to the closest obstacle
Maximum permissible speed According to one embodiment of the invention, the S7 in the cabin is connected via a PROFIBUS line to both process computers or S7, which are mounted on the bridge of the crane installation. A compressor on the crane cross-member for the pneumatics is likewise controlled via this S7. A fail-safe data collection point is located on the crane cross-member. The fail-safe sensors for tail retraction, the emergency-off in the cabin, the winch arm pivoting sensor, the cable output sensor and the cable load sensor of the winch are connected thereto. The data is now passed further upwards, past the rotating rim, to a fail-safe control unit which is mounted on the crane bridge. Here, the computation results of the two sensor evaluation panels, the pilot's demands and the states of the sensors are checked to ensure that they match and, if the result is positive, the drives of the crane installation are operated. In order to allow the blocked zones in the hall to be entered into the installation, a mobile panel is also connected by radio to the system, and is also used for definition of the crane parameters, such as speeds for longitudinal and lateral movement, and rotation rate. The control system for the crane installation is supplemented by a radio module which provides the safety observer on the ground with the capability to interrupt the crane movement by emergency-off and, if required, to take over the control process completely.

The approach is for the helicopter cabin to be connected to the crane bridge merely via an electrical power line, and a maximum of one data line. The electrical power supply can be provided via sliding contact power. This is designed for further crane bridges.

According to one embodiment of the invention, in order to achieve the Category 3 control, a distinction is drawn between a left-hand and a right-hand row of sensors. The input sensors on the left supply a process computer or a PLC with the co-ordinates of the helicopter. The permissible speeds are calculated in this computer on the basis of a hall data model. On the left-hand side, the zero-point of the underlying co-ordinate system is in the north-east corner. For the right-hand row of sensors the logic is the same, but a second array is used, whose zero-point is diagonally opposite the first. The desired movement is carried out via a fail-safe PLC only if the computation results of the two units match. There are therefore two independent sensor inputs to one fail-safe PLC. In order to further improve the safety, a modified data array can be used in the second evaluation programming. The information is then stored in this data array as an integer, on a two-dimensional array. An (X; Y) co-ordinate in an integer then carries the value of the column height.

According to one embodiment of the invention, the hall is composed of imaginary cubes with an edge length of one meter. These are stored in the control system as memory addresses. If a cube is permissible for the helicopter, then the content of the memory cell is zero, and if the cube is a blocked zone, then a 1 is written to the memory address. This therefore results in a three-dimensional array as a model of the hall. Walls and floors are likewise stored as blocked zones. The distance to the closest obstacle is required in order to determine the permissible speed. This is done by setting up an imaginary rectangular surface under the helicopter, on which space is provided for the helicopter cabin. This surface is extended at the sides by a number of spatial elements, and is shifted downwards by a number of spatial elements. A check now starts by checking the surface elements for any blocking bits. If no blocking bit if found, then a movement can be carried out at the maximum speed. If a blocking bit is found, then the speed is reduced, and the next smaller and next higher surface are checked. If no blocking bit is found here either, then the outer surface is scanned again. If a blocking bit is also found in the inner surface, then the speed is reduced once again, the next inner surface is checked, and the outer surface check is ceased. This procedure results in the stepwise adjustment of the speed up to creep speed. Finally, the helicopter comes to rest at the obstacle.

This check leads to a result within a predictable number of loop runs. A maximum time can therefore be specified for the check. The closer an obstacle comes to the cabin, the fewer bits need be checked, because the area is reduced, as is the current speed. This ensures that the check has been completed before the helicopter has moved too far. The check does not require any trigonometric calculations, and operates exclusively by means of comparisons.

According to one embodiment of the invention, a touch panel is used to enter the data of the hall into the control system. The height at which one is located is shown on the left-hand side. Clicking on a surface element therefore blocks this area entirely down to the bottom. It is possible to scroll through the layers of the hall by means of the slide on the left-hand side. The blue column on the left-hand side shows the instantaneous height of the helicopter. If the slide is moved to the level of the blue bar, then the position of the helicopter is shown as a blue surface on the chosen plane. Each area element that is clicked on corresponds to a memory cell in the hall array, which is in turn the basis of the collision checks.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings. The invention is, however, not restricted to the embodiments shown.

In the figures.

DETAILED DESCRIPTION

The following detailed description refers to the accompanying drawings that show, by way of illustration, specific details and embodiments in which the invention may be practiced.

Figure 1:
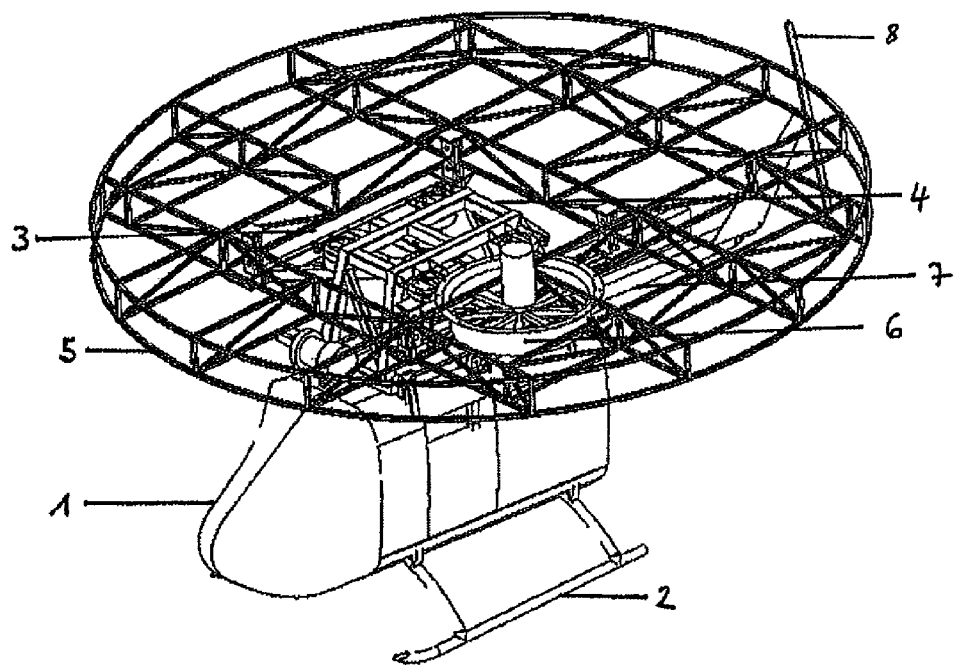
FIG. 1 shows a schematic perspective illustration of an air rescue simulator according to one embodiment of the invention.

FIG. 1 shows one embodiment of the simulator according to the present invention. In this case, the passenger cabin 1 and the helicopter skids 2 are suspended via a cross-member 3 and a frame structure 4 on the crane trolley of a bridge crane (not shown), wherein suspension is achieved via cables which connect the lifting mechanism of the crane trolley to the crane cross-member (not shown), and with the simulator furthermore having a rotor mock-up 5 formed from a space fram structure, a wind generator 6 which is connected to the rotor mock-up 5, a helicopter tail 7 which can be shortened by means of a telescopic mechanism, and a tail rotor 8 composed of GFC-reinforced hard foam.

Figure 2:
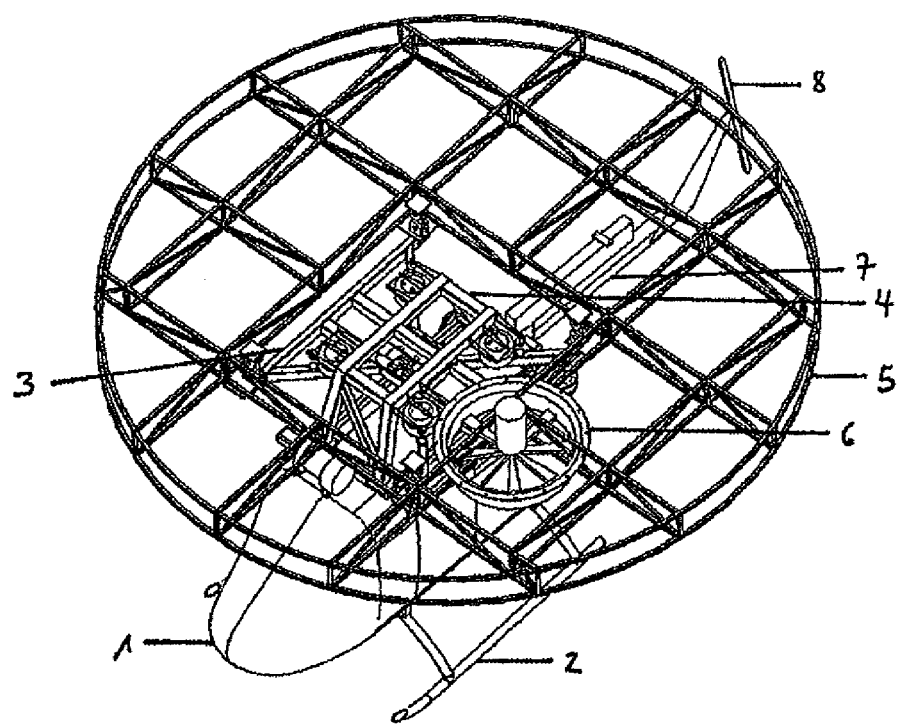
FIG. 2 shows a schematic perspective illustration of the air rescue simulator as shown in FIG. 1, from a different perspective.

FIG. 2 shows the same embodiment as FIG. 1 from a different perspective.

Figure 3:
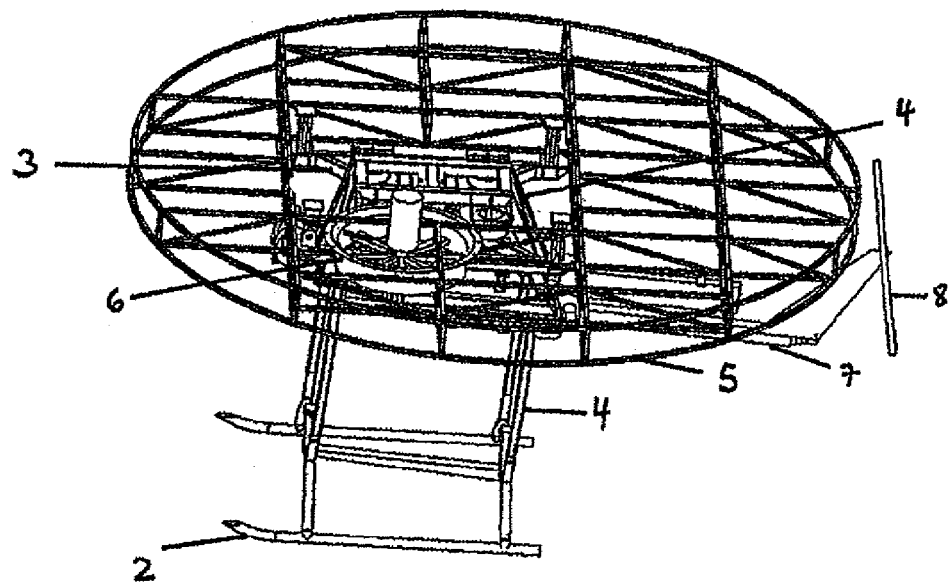
FIG. 3 shows a schematic perspective illustration of one possible embodiment of a detail of the air rescue simulators shown in FIGS. 1 and 2.

FIG. 3 shows the same embodiment as FIGS. 1 and 2 without the passenger cabin.

Figure 4:
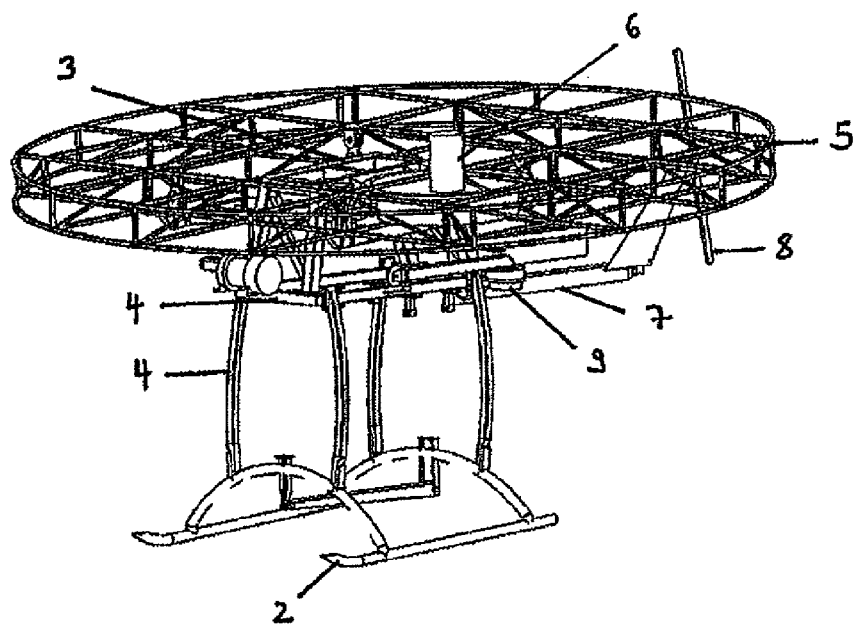
FIG. 4 shows a schematic perspective illustration of the air rescue simulator as shown in FIG. 3, from a different perspective.

FIG. 4 shows the same embodiment as FIG. 3 from a different perspective. This perspective shows the winch 9, which is attached to the frame structure, with a pivotable cantilever arm.

Figure 5:
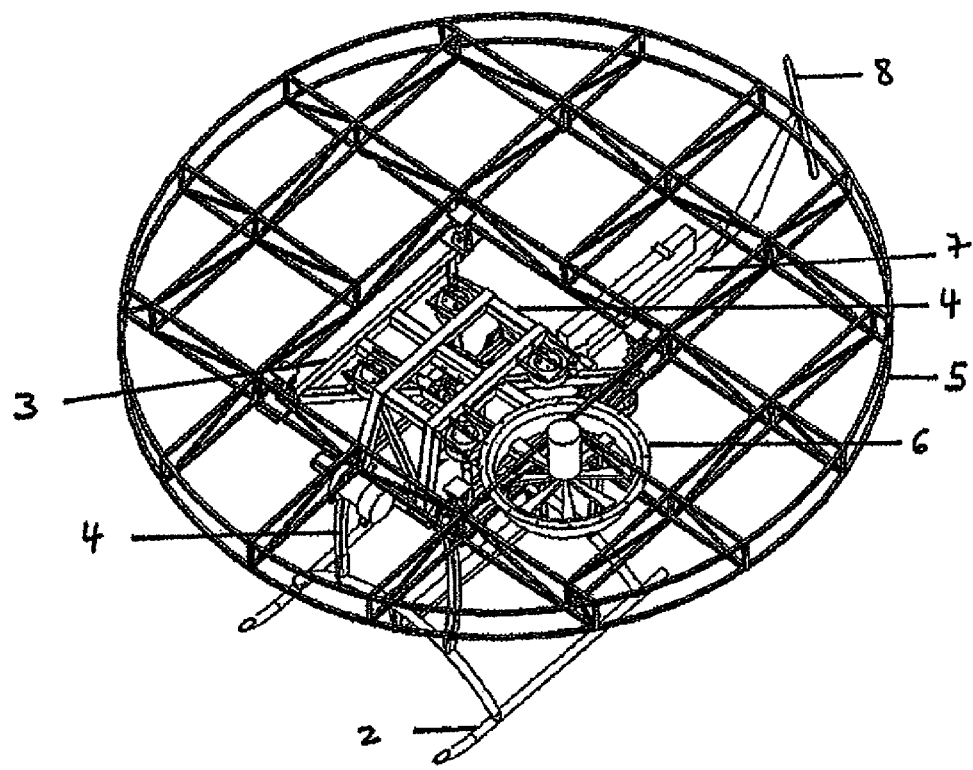
FIG. 5 shows a schematic perspective illustration of the air rescue simulator as shown in FIG. 3, from a different perspective.

FIG. 5 shows the same embodiment as FIG. 3 from a different perspective.

Figure 6:
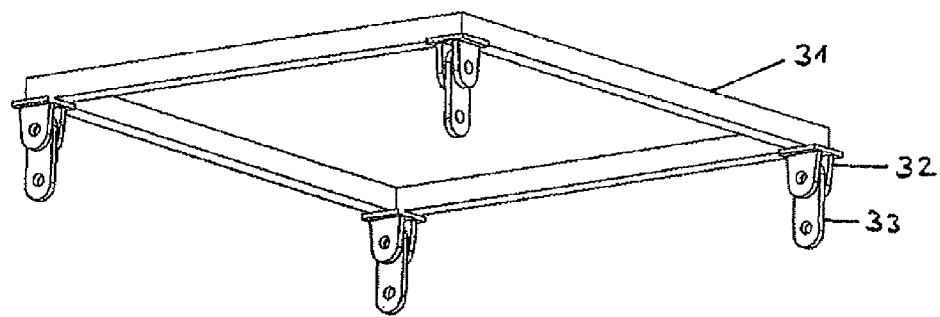
FIG. 6 shows a schematic perspective illustration of one possible embodiment of a detail of the air rescue simulators shown in FIGS. 1 to 5.

FIG. 6 shows a detailed view of the upper part of the cross-member 3, that is to say the crane cross-member, which is connected via suspension lugs to the lower part of the cross-member 3 (not shown). The upper part of the crane cross-member comprises a rectangular frame 31, close to whose corner points the holders 32 for the suspension lugs 33 are arranged.

Figure 7:
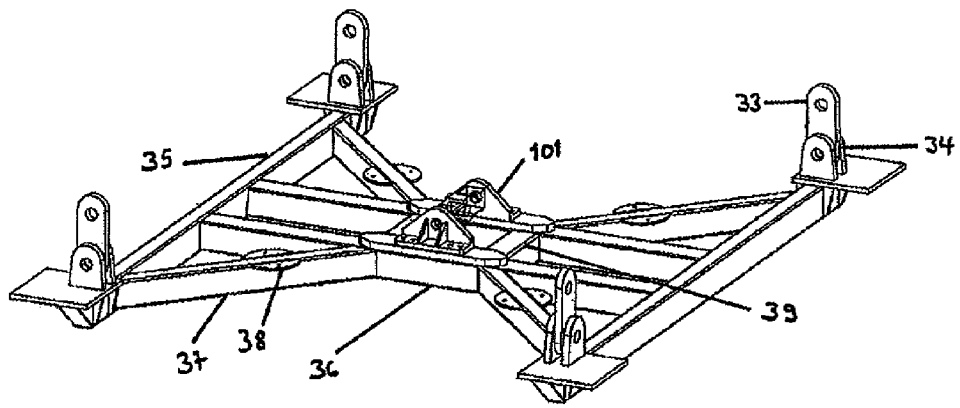
FIG. 7 shows a schematic perspective illustration of one possible embodiment of a detail of the air rescue simulators shown in FIGS. 1 to 5.

FIG. 7 shows a detail view of the lower part of the cross-member 3. The lower part of the cross-member 3 comprises two horizontal frame parts 35, close to each of whose ends a holder 34 for the suspension lugs 33 is arranged, and which are connected via two frame parts 36, which are arranged at a right angle to the horizontal frame parts, and to which a part of the gimbal joint 101 is attached. Furthermore, the frame parts 35 and 36 are connected via stiffening elements 37, which are arranged at an angle of about 45° to the frame parts 35 and 36 and, approximately centrally, have contact points 38 for the pneumatic springs of the gimbal frame (not shown). The frame elements 36 are connected to one another by means of two cross braces 39 which are arranged at right angles thereto.

Figure 8:
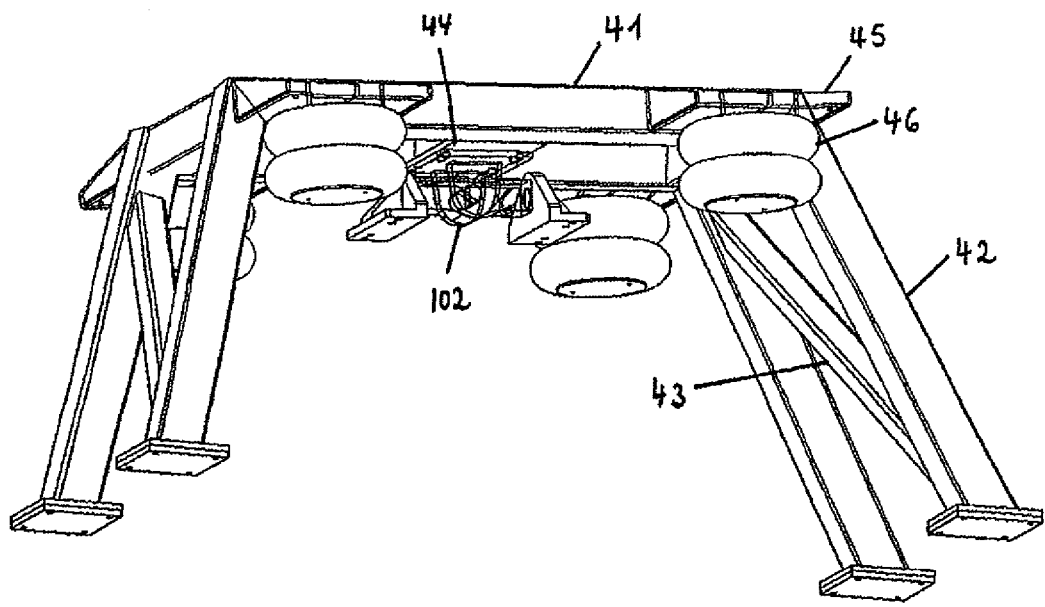
FIG. 8 shows a schematic perspective illustration of one possible embodiment of a detail of the air rescue simulators shown in FIGS. 1 to 5.

FIG. 8 shows a detailed view of the gimbal frame, which has the parts 41, 42, 43, 44, 45, a part of the gimbal joint 102 and pneumatic springs 46. The gimbal frame consists of four vertically arranged frame parts 42, which are firmly connected at their upper ends to a rectangular, horizontally arranged frame part 41 and are firmly connected at the bottom to the roof frame (not shown). Close to the corner points, the frame part 41 has the suspension points 45 for the pneumatic springs 46 and, in the center, a cross brace 44, to which the gimbal joint 102 is attached. Two frame elements 42 are in each case connected by stiffening elements 43.

Figure 9:
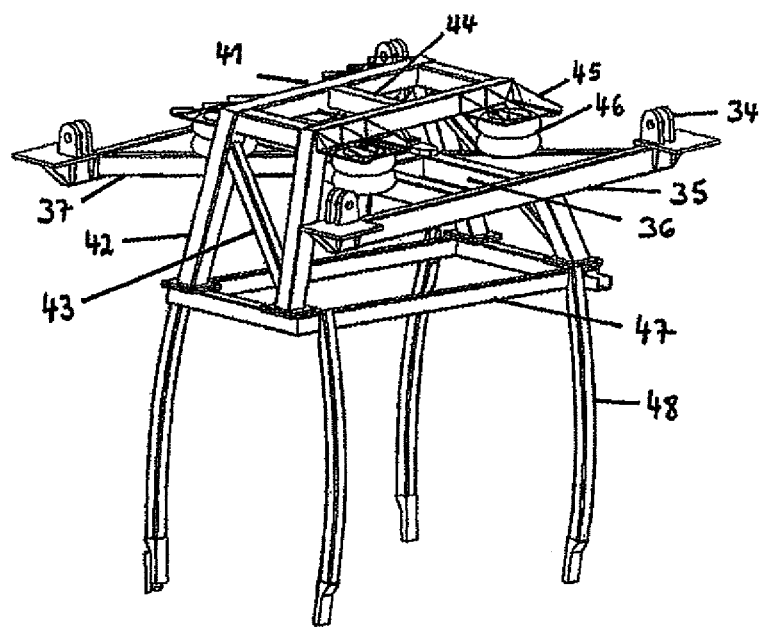
FIG. 9 shows a schematic perspective illustration of one possible embodiment of a detail of the air rescue simulators shown in FIGS. 1 to 5.

FIG. 9 shows a detail view of a part of the frame structure and of the lower part of the cross-member 3. The frame structure comprises the gimbal frame with the frame parts 41, 42, 43, 44 and 45, the pneumatic springs 46, the roof frame and the cabin frame 48. Therein, the rectangular roof frame 47 is close to the corner points firmly connected to four vertically arranged parts of the cabin frame 48 and to the four vertically arranged parts of the gimbal frame 42. The frame structure with the parts 41, 42, 43, 44, 45, 46, 47 and 48 is connected via a gimbal joint (which cannot be seen) to the lower part of the cross-member 3, which comprises the parts 34, 35, 36, 37, 38 (which cannot be seen) and 39 (which cannot be seen).

Figure 10:
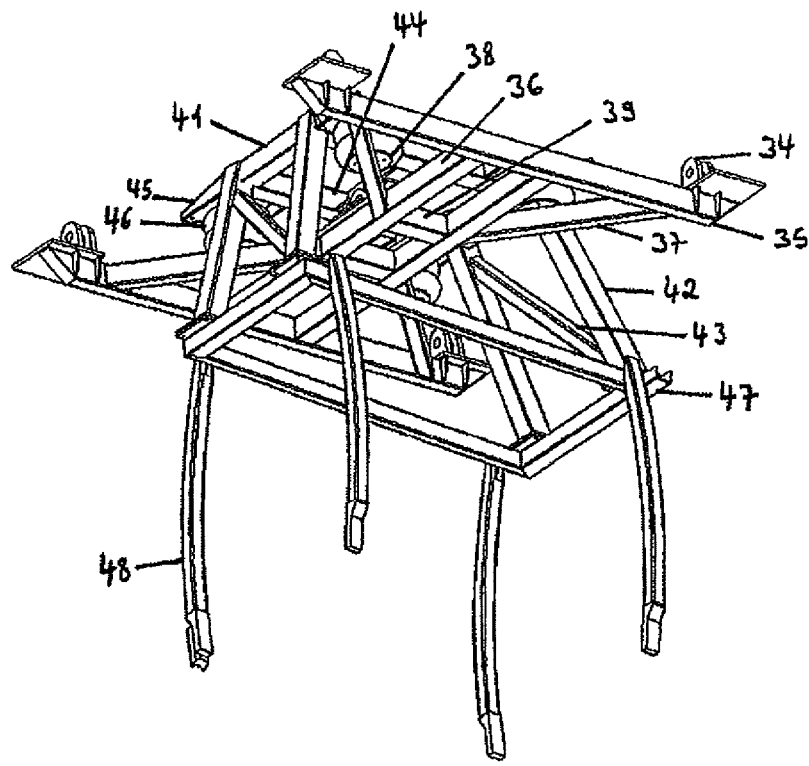
FIG. 10 shows a schematic perspective illustration of one possible embodiment of a detail of the air rescue simulators shown in FIGS. 1 to 5.

FIG. 10 shows the same part of the frame structure with the lower part of the cross-member 3 as FIG. 9, from a different perspective. The parts 38 and 39 of the lower part of the cross-member 3 can be seen from this perspective.

Figure 11:
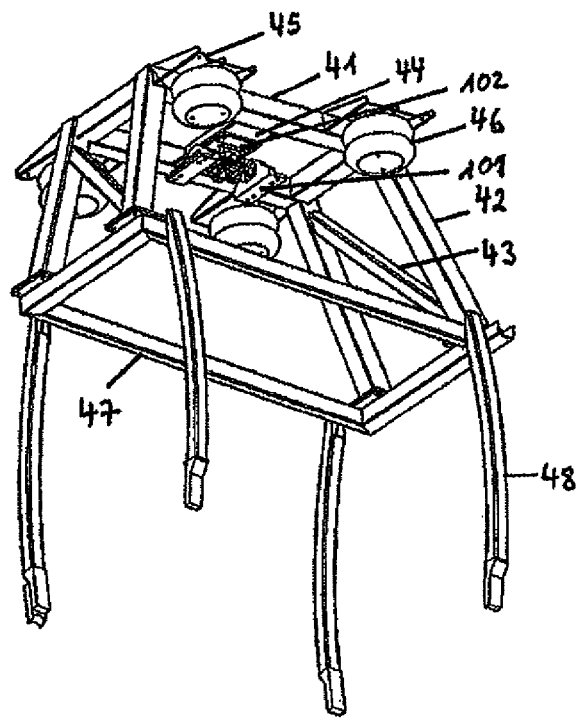
FIG. 11 shows a schematic perspective illustration of one possible embodiment of a detail of the air rescue simulators shown in FIGS. 1 to 5.

FIG. 11 shows the same part of the frame structure as FIG. 10, without the lower part of the cross-member 3. The gimbal joint with the parts 101 and 102, which is attached to the gimbal frame, can be seen in this illustration.

Figure 12:
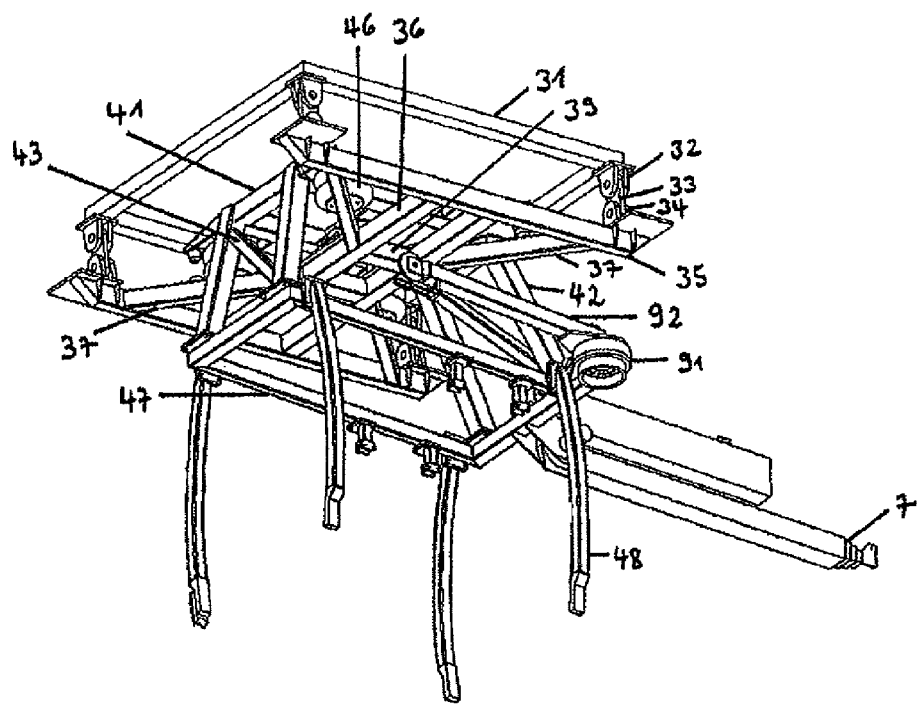
FIG. 12 shows a schematic perspective illustration of one possible embodiment of a detail of the air rescue simulators shown in FIGS. 1 to 5.

FIG. 12 shows the same part of the frame structure with the lower part of the cross-member 3 as FIG. 10. In addition, the upper part of the cross-member 3 can also be seen, with the frame 31 and the holders 32 for the suspension lugs 33, which are used for connection to the lower part of the cross-member 3. The helicopter tail 7 and the winch 91 with the pivotable cantilever arm 92 can also be seen.

Figure 13:
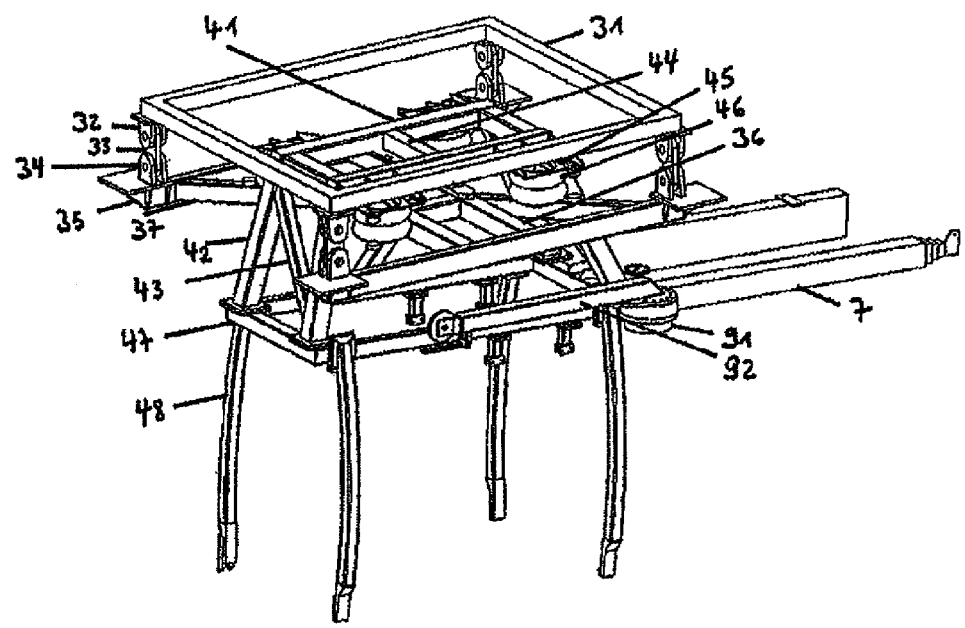
FIG. 13 shows a schematic perspective illustration of one possible embodiment of a detail of the air rescue simulators shown in FIGS. 1 to 5.

FIG. 13 shows the same part of the simulator according to one embodiment of the invention as FIG. 12, from a different perspective.

Figure 14:
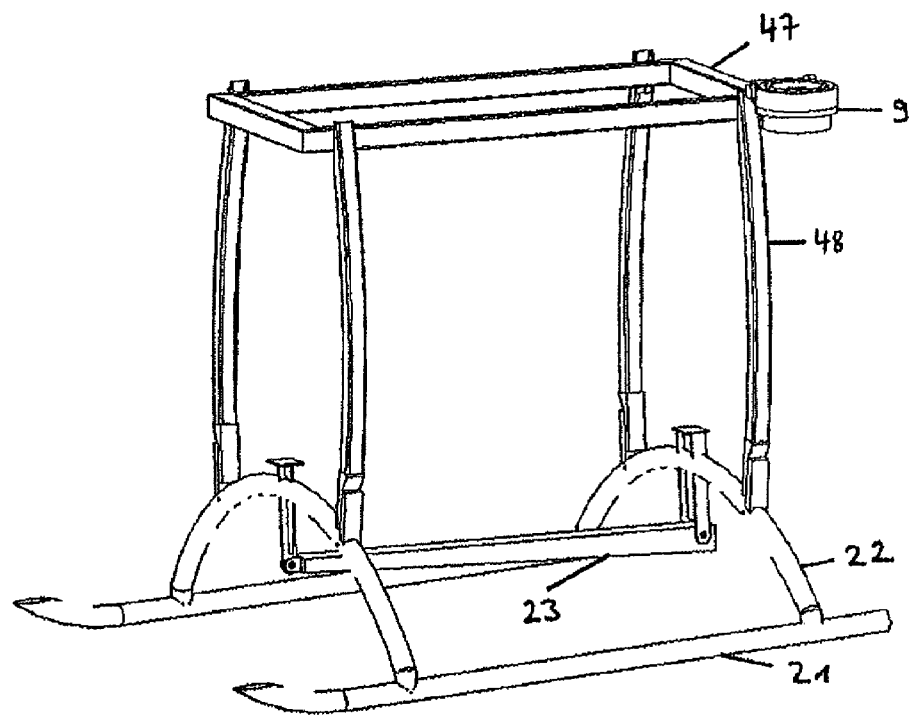
FIG. 14 shows a schematic perspective illustration of one possible embodiment of a detail of the air rescue simulators shown in FIGS. 1 to 5.

FIG. 14 shows a detail view of the lower part of the frame structure with the rectangular roof frame 47, close to whose corner points the four vertically arranged elements of the cabin frame 48 are attached. Two of the lower ends of the vertical elements of the cabin frame 48 are in each case connected to a convex skid connecting element 22. Skids 21 are fitted to the ends of the skid connecting element 22. The two skid connecting elements 22 are also connected underneath the passenger cabin by means of a stabilization element 23. The winch 9 is attached to one corner of the roof frame 47.

Figure 15:
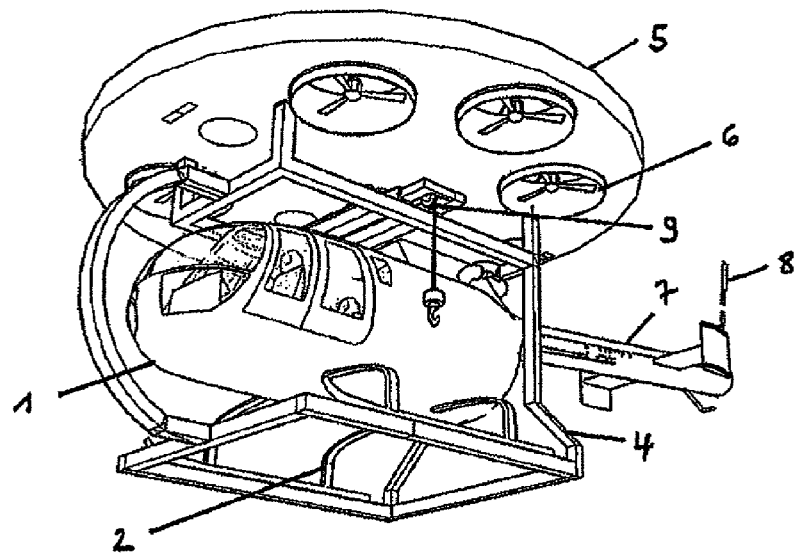
FIG. 15 shows a schematic perspective illustration of an air rescue simulator according to one embodiment of the invention.

FIG. 15 shows another embodiment of the air rescue simulator according to the invention, in which the frame structure 4 is located outside the passenger cabin 1. The frame structure 4 is connected to the roof of the passenger cabin 1, to the skids of the helicopter 2 and to the rotor mock-up 5. Furthermore, the simulator has a helicopter tail 7 with a tail rotor 8, a winch 9 and a plurality of wind generators 6, which are arranged in the rotor mock-up 5.

Figure 16:
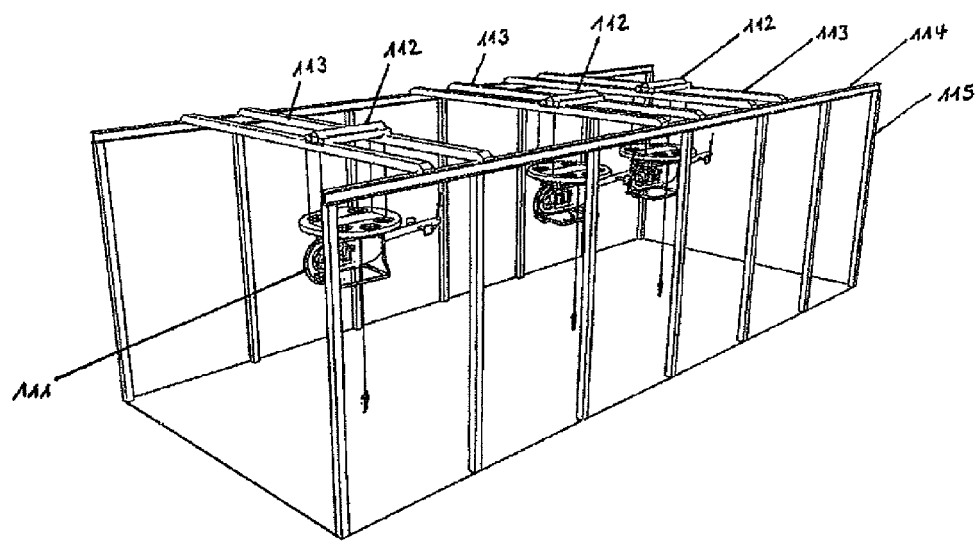
FIG. 16 shows a schematic perspective illustration of an air rescue simulator according to one embodiment of the invention.

FIG. 16 shows three of the embodiments of the simulator as shown in FIG. 15, together with a crane system in a hall, with the helicopter cabins 111 being suspended on a bridge crane. The bridge crane has three crane bridges 113, each with a crane trolley 112 which can move on crane track supports 114, which are mounted on supports 115 along the wall of a hall structure. The hall walls and/or the hall roof may, for example, be transparent, in order to allow the external weather to be included in the hall atmosphere. This makes the simulation more realistic. Furthermore, according to one embodiment of the invention, the hall roof and/or the hall walls may at least partially be open, in order to also include rain, snowfall, wind and outside temperatures in the simulation, when required.

Figure 17:
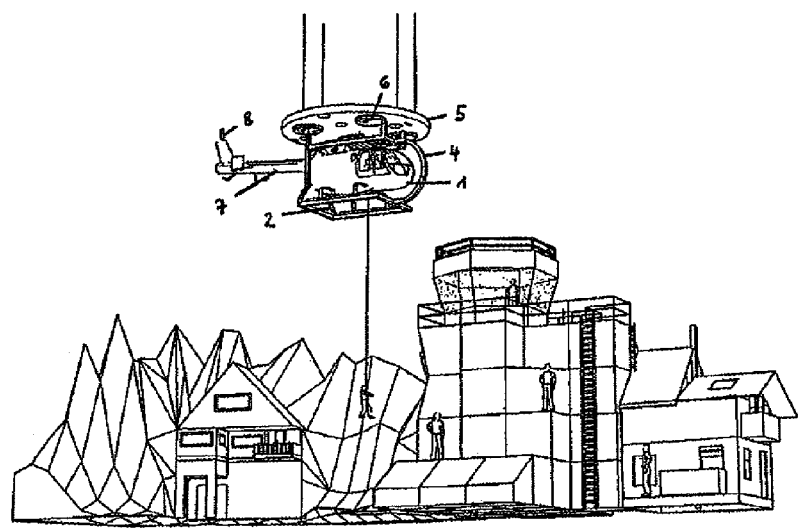
FIG. 17 shows a schematic perspective illustration of an air rescue simulator according to one embodiment of the invention.

FIG. 17 shows the use of the embodiment of the invention as shown in FIG. 15, in a model environment.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An air rescue simulator, wherein the simulator comprises a helicopter passenger cabin, which is attached to a crane system, wherein the helicopter passenger cabin is attached to the crane system, during simulation, via a frame structure comprising a cabin frame, wherein the cabin frame supports the static load of the helicopter passenger cabin, and wherein the cabin frame is fitted in the interior of the helicopter passenger cabin, is externally fitted on the helicopter passenger cabin, and/or is integrated in a side wall part, roof part, and/or a bottom part of the helicopter passenger cabin.

2. The air rescue simulator as claimed in claim 1, wherein the helicopter passenger cabin is an original helicopter which can no longer fly and has been gutted.

3. The air rescue simulator as claimed in claim 1, wherein the helicopter passenger cabin is suspended on the crane system via the frame structure by means of one or more cables.

4. The air rescue simulator as claimed in claim 1, wherein the crane system is a gantry crane, semi-gantry crane or bridge crane.

5. The air rescue simulator as claimed in claim 4, wherein the crane system has a crane trolley to which the helicopter passenger cabin is attached.

6. The air rescue simulator as claimed in claim 5, wherein the crane trolley of the crane system has a lifting mechanism and a rotating apparatus.

7. The air rescue simulator as claimed in claim 1, wherein the frame structure which supports the static load is connected to a cross-member for suspension on the crane system.

8. The air rescue simulator as claimed in claim 7, wherein the cross-member comprises an upper part, which is used for suspension on the crane system, and a lower part, which is used for suspension of the frame structure.

9. The air rescue simulator as claimed in claim 8, wherein the frame structure is suspended on the lower part of the cross-member by means of a tilting joint.

10. The air rescue simulator as claimed in claim 9, wherein the frame structure is suspended on the lower part of the cross-member by means of a gimbal joint.

11. The air rescue simulator as claimed in claim 10, wherein the frame structure comprises a gimbal frame for suspension on the lower part of the cross-member by means of the gimbal joint, a roof frame which is firmly connected to the roof of the helicopter passenger cabin, and a cabin frame which is firmly connected to the roof frame and surrounds the helicopter passenger cabin.

12. The air rescue simulator as claimed in claim 11, wherein the gimbal frame and lower part of the cross-member, which are connected via a gimbal joint, can be moved relative to one another by means of adjustment elements.

13. The air rescue simulator as claimed in claim 12, wherein the adjustment elements are pneumatic springs.

14. The air rescue simulator as claimed in claim 1, wherein the simulator has helicopter skids which are attached to the helicopter passenger cabin or to the frame structure.

15. The air rescue simulator as claimed in claim 14, wherein the helicopter skids are steel skids.

16. The air rescue simulator as claimed in claim 1, wherein the helicopter passenger cabin has a helicopter tail.

17. The air rescue simulator as claimed in claim 16, wherein the helicopter tail can be extended by means of a telescopic mechanism.

18. The air rescue simulator as claimed in claim 16, wherein the helicopter tail has a plastic tail rotor, with the tail rotor drive and the plastic being designed such that no serious injuries occur on collision with a person.

19. The air rescue simulator as claimed in claim 1, wherein the simulator has a rotor mock-up.

20. The air rescue simulator as claimed in claim 19, wherein the rotor mock-up is connected to a cross-member and/or to the frame structure.

21. The air rescue simulator as claimed in claim 19, wherein the rotor mock-up is in the form of a space frame structure.

22. The air rescue simulator as claimed in claim 1, wherein the simulator has a winch, and wherein the winch is attached to the helicopter passenger cabin or to the frame structure by means of a pivotable cantilever arm.

23. The air rescue simulator as claimed in claim 1, wherein the simulator has one or more wind generators in order to simulate the downwash from the rotor blades.

24. The air rescue simulator as claimed in claim 23, wherein one or more wind generator(s) is or are arranged above the entry and winch area of the helicopter passenger cabin and/or above the cockpit.

25. The air rescue simulator as claimed in claim 1, wherein the simulator has one or more stroboscopic flashlights which simulate light effects caused by rotating rotor blades.

26. The air rescue simulator as claimed in claim 1, wherein wind generators and/or stroboscopic flashlights are arranged in a rotor mock-up connected to a cross-member and/or to the frame structure.

27. The air rescue simulator as claimed in claim 1, wherein control elements for controlling the simulator are available in the helicopter passenger cabin.

28. The air rescue simulator as claimed in claim 27, wherein the height of the helicopter passenger cabin above ground, the direction of travel and the speed of travel, the inclination position and/or the rotation of the cabin can be controlled by means of the control elements.

29. The air rescue simulator as claimed in claim 27 wherein the control signals from the control elements are processed by a freely programmable computer unit.

30. The air rescue simulator as claimed in claim 29, wherein the control unit is connected to a digital data model in order to simulate realistic flight operation.

31. The air rescue simulator as claimed in claim 30, wherein the data model comprises a 3D data area in which the geometric structure of the area surrounding the crane system is mapped, such that either the parameter "obstacle" or the parameter "no obstacle" is associated with each three-dimensional point, with the control signals from the control elements being implemented only when the control signals result in a movement of the helicopter passenger cabin within the "no obstacle" data subarea.

32. The air rescue simulator as claimed in claim 1, wherein the simulator has a radio system which is coupled to one or more radio helmets of one or more users.

33. The air rescue simulator as claimed in claim 32, wherein background noise such as wind noise, rotor noise or turbine noise can be played into one or more headsets of the users via a radio system.

34. The air rescue simulator as claimed in claim 1, further comprising a radio helmet, wherein a headset for radio reception is incorporated in a closed shell of the helmet.

* * * * *